United States Patent [19]

Boord et al.

[11] Patent Number: 5,793,912
[45] Date of Patent: Aug. 11, 1998

[54] TUNABLE RECEIVER FOR A WAVELENGTH DIVISION MULTIPLEXING OPTICAL APPARATUS AND METHOD

[75] Inventors: Warren Timothy Boord, Brooklyn Park; Anil K. Jain, North Oaks, both of Minn.

[73] Assignee: Apa Optics, Inc., Blaine, Minn.

[21] Appl. No.: 769,459

[22] Filed: Dec. 18, 1996

Related U.S. Application Data

[63] Continuation-in-part of Ser. No. 482,642, Jun. 7, 1995, Pat. No. 5,608,826, which is a continuation-in-part of Ser. No. 257,083, Jun. 9, 1994, Pat. No. 5,450,510.

[51] Int. Cl.$^6$ .............................. G02B 6/34; G02B 6/12; G02B 6/28
[52] U.S. Cl. .............................. 385/37; 385/9; 385/14; 385/24; 385/40; 385/41; 385/31; 359/15; 359/34; 359/114; 359/115; 359/130
[58] Field of Search ................. 385/1, 2, 4, 8, 385/9, 11, 14, 15, 24, 27, 28, 31, 37, 40, 41, 47, 49, 88, 89, 129, 130, 131, 132; 359/114, 115, 130, 181, 127, 124, 15, 34

[56] References Cited

U.S. PATENT DOCUMENTS

| | | | |
|---|---|---|---|
| 4,723,829 | 2/1988 | Koonen | 385/37 |
| 4,973,169 | 11/1990 | Slonecker | 385/1 |
| 5,005,935 | 4/1991 | Kunikane et al. | 385/24 |
| 5,224,183 | 6/1993 | Dugan | 385/24 |
| 5,228,103 | 7/1993 | Chen et al. | 385/14 |
| 5,278,687 | 1/1994 | Jannson et al. | 359/125 |
| 5,355,237 | 10/1994 | Lang et al. | 385/37 |
| 5,608,826 | 3/1997 | Boord et al. | 385/37 |

FOREIGN PATENT DOCUMENTS

| | | |
|---|---|---|
| 00 31 027 | 7/1981 | European Pat. Off. |
| WO 91 14 321 | 9/1991 | WIPO |

OTHER PUBLICATIONS

Patent Abstracts of Japan, vol. 014 No. 036 (E–877), 23 Jan. 1990 & JP,A,01 270284 (Hitachi Ltd) 27 Oct. 1989 see abstract.
EEE Photonics Technology Letters, vol. 5, No. 9, Sep. 1993 New York US, pp. 1098–1100, XP 000414187 KC Reichman et al. '2.5 Gb/s Transmission Over 674 km at Multiple Wavelengths Using a Tunable DBR Laser with an Integrated Electroabsorption Modulator' see p. 1098, left column, paragraph 1.
Y. Kanabar et al., "High Density Wavelength Division Multiplexing for Multiple Access Networks", Mar. 1991.
J.P. Lin et al., "Four–channel Ti: LiNbO$_3$ Wavelength Division Multiplexor for 1.3–μm Wavelength Operation", *Optics Letters*, vol. 16, No. 7, Apr. 1, 1991, pp. 473–475.
David J. Prat, "High Performance 4–Wavelength Laser Transmitter", *SPIE* vol. 1788 Sources and Detectors for Fiber Communications (1992), pp. 152–158.
S.S. Wagner et al., "Broadband High–Density WDM Transmission Using Superluminescent Diodes", *Electronics Letters* May 24, 1990, vol. 26, No. 11, pp. 696–697.
S.S. Wagner et al., "Experimental Demonstration of a Passive Optical Subscriber Loopo Architecture", *Electronics Letters*, Mar. 17, 1988, vol. 24, No. 6, pp. 344–346.
D.R. Wisely, "32 Channel WDM Multiplexer with 1nm Channel Spacing and 0.7nm Bandwidth", *Electronics Letters*, Mar. 14, 1991, vol. 27, No. 6, pp. 520–521.

*Primary Examiner*—Brian Healy
*Attorney, Agent, or Firm*—Merchant, Gould, Smith, Edell, Welter & Schmidt, P.A.

[57] ABSTRACT

A method and apparatus for automatically providing for both multiplexing and independent external modulation of two or more wavelengths emitted by one or more multi-longitudinal mode laser(s) or other light source. The present invention uses an integrated optics device chip to enable coupling of the dispersed wavelengths into separate electro-optic modulators which encode each of the carrier wavelengths with a different signal. Accordingly, the volume of data which can be transmitted over an optical fiber network is increased. The carrier wavelengths can be transmitted over single or multi-mode optical fibers.

27 Claims, 12 Drawing Sheets d/c = COS D/COS I

TUNABLE RECEIVER FOR A WAVELENGTH DIVISION MULTIPLEXING OPTICAL APPARATUS AND METHOD

RELATED APPLICATIONS

This is a continuation-in-part application of U.S. patent application Ser. No. 08/482,642, filed Jun. 7, 1995, now U.S. Pat. No. 5,608,826, which is a continuation-in-part of U.S. patent application Ser. No. 08/257,083, now U.S. Pat. No. 5,450,510 filed Jun. 9, 1994.

FIELD OF THE INVENTION

This invention relates generally to an optic device; more particularly to an optical receiver for high density wavelength division multiplexing ("WDM") fiber optic communication systems; and more particularly still to an optical and electronic device which can be tuned to spatially disperse the specific laser wavelengths of a WDM optical link, detect the signal encoded on each of the optical wavelengths, and convert the detected optical signals to an amplified electrical signal for interfacing electronic instrumentation.

BACKGROUND OF THE INVENTION

The impact of advances in photonics technology in the area of communication systems has been dramatic. By way of example, new communication system architectures have been proposed based on such photonics technology. These communication architectures take advantage of the ability of optical fibers to carry very large amounts of information—with very little marginal cost once the optical fiber is in place.

In general, a photonics communication system architecture includes: switching operations located at the edges of the network; distributing large amounts of information ("bundles") throughout the network; and information filtering operations at gateways at the edges of the network. These approaches also often build on optical wavelength division multiplexing or optical frequency division multiplexing (coherent techniques) to deliver the bundles of information throughout the network. The information carrying potential of the optical fiber systems is further enhanced with the use of external modulators for higher speed modulation of the guided light beam.

In the past, external modulators have been used to modulate the entire spectrum which is generated by the laser. Therefore, all of the wavelengths emitted by the laser carried the same information through the optical fiber. Since the different wavelengths travel at different speeds through the fiber, at large distances, interference between the wavelengths carrying the same information occurred.

Also in the past, multi-mode fibers have been utilized to carry different wavelength signals—though different lasers were utilized to generate the signals. Due in part to the ability to control the output wavelength of the lasers, the wavelengths have been selected to utilize two or more of the fiber optic windows of absorption. However, since a single window is typically the optimum transmission range, these devices suffer a drawback of not transmitting all information at the optimum wavelength window of absorption for the optical fiber over which the information will be transmitted.

Therefore, there arises a need for a photonic method and apparatus which enables external modulation of two or more longitudinal modes of a multi-longitudinal mode semiconductor laser in which each of the longitudinal modes can be independently and simultaneously modulated. Such an apparatus comprises a wavelength division multiplexer ("WDM"). There is also a need for an optical receiver which can be tuned to detect different wavelengths of the dense WDM optical communication link. The receiver must provide tuning capability to accommodate different center wavelengths of the WDM apparatus, and also different wavelength separation of the set of discrete wavelengths of the WDM apparatus. An apparatus and method for providing this combination of wavelength division multiplexing and external modulation results in increased optical fiber information transmission capacity. The present invention directly addresses and overcomes the shortcomings of the prior art.

SUMMARY OF THE INVENTION

The present invention provides a simple, relatively inexpensive and yet reliable method and apparatus for increasing the amount of data which can be carried over an optical wave carrier. In the preferred embodiment, the invention accomplishes this result by physically separating previously non-utilized wavelengths from a single multi-longitudinal mode laser, externally modulating the physically separated wavelengths, and coupling the wavelengths into a single optical wave carrier (i.e., the wavelengths are "multiplexed" into a single optical fiber). The preferred receiver of the invention includes wavelength tuning means and magnification means for magnifying the spatial dispersion of the beams either at a photodetector array of the receiver or at a linear optical fiber array in which each fiber transmits a single wavelength channel to a single element photodetector. These means are implemented by using a lens assembly and a zoom lens assembly.

In an embodiment constructed in accordance with the principles of the present invention, the wavelength division multiplexer ("WDM") is an integrated optic based device which provides for both multiplexing and independent external modulation of several wavelengths emitted by a multi-longitudinal mode laser. The wavelengths are physically separated from one another by a diffraction grating and the separated wavelength beams are individually focused onto corresponding directional coupler modulators. The light beams exiting the directional coupler modulators are coupled to a single optical fiber which transmits the information coded wavelengths to a receiver. As noted above, the receiver provides wavelength tuning means for compensating for the differing wavelengths $\lambda_c$ and magnification means for magnifying the spatial dispersion of the beams either at a photodetector array of a receiver, or at an optical fiber array.

One feature of the present invention is the use of an integrated optics device chip to enable coupling of the dispersed laser wavelengths into separate electro-optic modulators which encode each of the carrier wavelengths with a different signal. Therefore, the device enables a larger data volume to be transmitted through an optical fiber network. This increase in the volume of data which can be transmitted is useful and often required for data systems that have an integrated form (e.g., where video, voice, and data are simultaneously distributed and processed). This improved system performance is in part achieved at relatively low cost because of the need for only one laser source (or by way of example in the alternative embodiments, a smaller number of light generating devices then number of wavelengths being used to carry information).

Another feature of the present invention is that the principles can be applied to alternative embodiments. For example, in one alternative embodiment, one or more laser diodes equal to "n" may be used to generate "m" wavelengths where m>n. In a second alternative embodiment, a light emitting diode may be used to generate a plurality of wavelengths, which are subsequently spatially separated and modulated.

Yet, another feature of the present invention is that through utilizing the primary and secondary mode wavelengths emitted by a single laser, narrow line widths are utilized (which reduces dispersion) and a single fiber optic window of minimized absorption can be utilized.

Still another feature of the present invention is utilization of a holographic grating to diffract the light beams exiting the directional coupler modulators so that they propagate parallel to each other after first being collimated. The parallel propagating beams are focused by a lens into a single mode optical fiber.

Yet another alternative feature of the present invention includes generating the plurality of optical signals of different wavelengths by using a light emitting diode (LED) for the source of electromagnetic radiation. A diffraction grating is used to disperse the continuous spectrum of emitted light so that each wavelength propagates in a different angular direction. The dispersed spectra is then imaged onto an input edge of an integrated optic device modulator chip.

Therefore, according to one aspect of the invention, there is provided an apparatus for receiving and decoding a plurality of wavelength division multiplexed signals from a single optical fiber, comprising: wavelength separation means, for spatially separating the different wavelength signals from the single optical fiber; a light detector array, or an optical fiber array with each fiber terminated at a light detector for detecting the modulated information in the different wavelength signals, wherein transmitted information may be processed, transmitted or stored; and wavelength tuning means, interposed between said wavelength separation means and said light detector array or optical fiber array, for tuning to different wavelengths $\lambda_c$ in the optical fiber transmission band, whereby accommodation is provided to both multi-longitudinal mode laser diodes or distributed feedback (DFB) laser diode arrays.

According to another aspect of the invention, there is provided an apparatus for receiving and decoding a plurality of wavelength division multiplexed signals from a single optical fiber, comprising: wavelength separation means, for spatially separating the different wavelength signals from the single optical fiber; a light detector array or an optical fiber array with each fiber terminated at a light detector for detecting the modulated information in the different wavelength signals, wherein transmitted information may be processed, transmitted or stored; and magnification means, physically interposed between said wavelength separation means and said light detector array or optical fiber array, for increasing the spatial dispersion of the focused laser beams at said light detector array or optical fiber array to accommodate different wavelength separation $\Delta\lambda$ between the carrier wavelengths $\lambda_i$ of the wavelength division multiplexed signals.

According to still another aspect of the invention, there is provided a system for transmitting and receiving wavelength division multiplexed signals over a single optical fiber, comprising: transmitter means, including: i) a single laser for generating a plurality of optical signals of different wavelengths; external modulator means for modulating the optical signals in accordance with control signals, whereby the optical signals carry information; and wavelength separation means, for spatially separating the different wavelength signals and directing the signals from the laser to the integrated optic modulator; a multi-mode or single mode optical fiber; and receiver means, including: wavelength separation means, for spatially separating the different wavelength signals transmitted by said optical fiber; a light detector array or optical fiber array for detecting the modulated information in the different wavelength signals, wherein transmitted information may be processed, transmitted or stored; wavelength tuning means, interposed between said wavelength separation means and said light detector array or optical fiber array, for tuning to different wavelengths $\lambda_c$ in the optical fiber transmission band, whereby accommodation is provided to both multi-longitudinal mode laser diodes or distributed feedback (DFB) laser diode arrays; and magnification means, physically interposed between said wavelength tuning means and said light detector array or optical fiber array, for increasing the spatial dispersion of the focused laser beams at said light detector array or optical fiber array to accommodate different wavelength separation $\Delta\lambda$ between the carrier wavelengths $\lambda_i$ of the wavelength division multiplexed signals.

While the invention will be described with respect to a preferred embodiment configuration and with respect to particular devices used therein, it will be understood that the invention is not to be construed as limited in any manner by either such configuration or components described herein. Also, while the particular types of laser, wavelength tuning device, and wavelength spatial physical separation device used in the preferred embodiment are described herein, it will be understood that such particular components are not to be construed in a limiting manner. Instead, the functionality of those devices should be appreciated. Further, while the preferred embodiment of the invention will be described in relation to transmitting and receiving information over an optical fiber, it will be understood that the scope of the invention is not to be so limited. The principles of the invention apply to the use of wavelength tuning of the detector array and magnification of the spatial dispersion of the focused laser beams to accommodate different wavelength separation between the carrier wavelengths of a WDM system. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawing which forms a part hereof and to the accompanying descriptive matter, in which there is illustrated and described a preferred embodiment of the invention.

BRIEF DESCRIPTION OF THE DRAWING

Referring to the drawing, wherein like numerals represent like parts throughout the several views.

DETAILED DESCRIPTION OF A PREFERRED EMBODIMENT

As noted above, the principles of the present invention apply to the external modulation of a plurality of wavelengths of light generated by a single laser source, wherein a larger amount of information may be transmitted over an optical wave carrier, such as one or more optical fibers. In the preferred embodiment, the invention accomplishes this result by physically separating previously non-utilized wavelengths from a single multi-longitudinal mode laser, externally modulating the physically separated wavelengths, and coupling the wavelengths into a single optical wave carrier (i.e., the wavelengths are "multiplexed" into a single optical fiber). However, it will be appreciated that the modulated wavelengths may be transmitted over one or more optical fibers.

Another principle of the present invention is the alternative use of one or more light sources (equal to "n" sources) and using "m" wavelengths from the "n" sources wherein m>n. Still another principle is the utilization of an LED as the light source. The foregoing two principles will be discussed below in connection with the third and fourth alternative embodiments.

Figure 1:
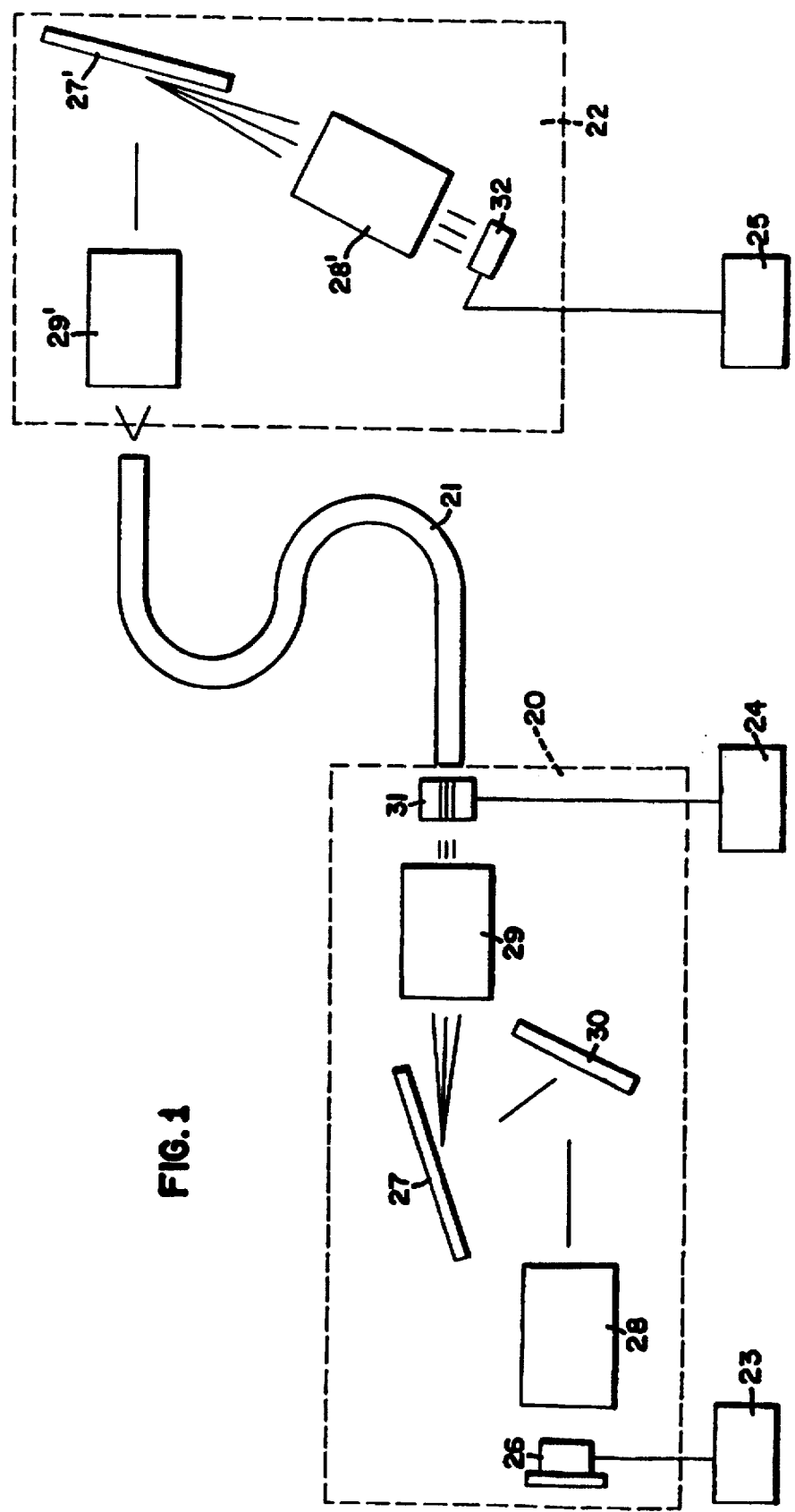
FIG. 1 is a functional block diagram of a wavelength division multiplexed optical modulator transmitter and receiver practicing the principles of the present invention.

A preferred embodiment of the device constructed according to the principles of the present invention includes the following components: a multi-longitudinal mode laser; a diffraction grating; collimating optics; focusing optics; and an integrated optic modulator. Referring first to FIG. 1, the WDM transmitter is illustrated generally at 20, the optical fiber is illustrated generally at 21, and the WDM receiver is illustrated generally at 22. Also illustrated in FIG. 1 are the laser power and temperature circuitry functional block 23, the directional coupler modulator controller functional block 24, and the detector array controller functional block 25.

Figure 13A:
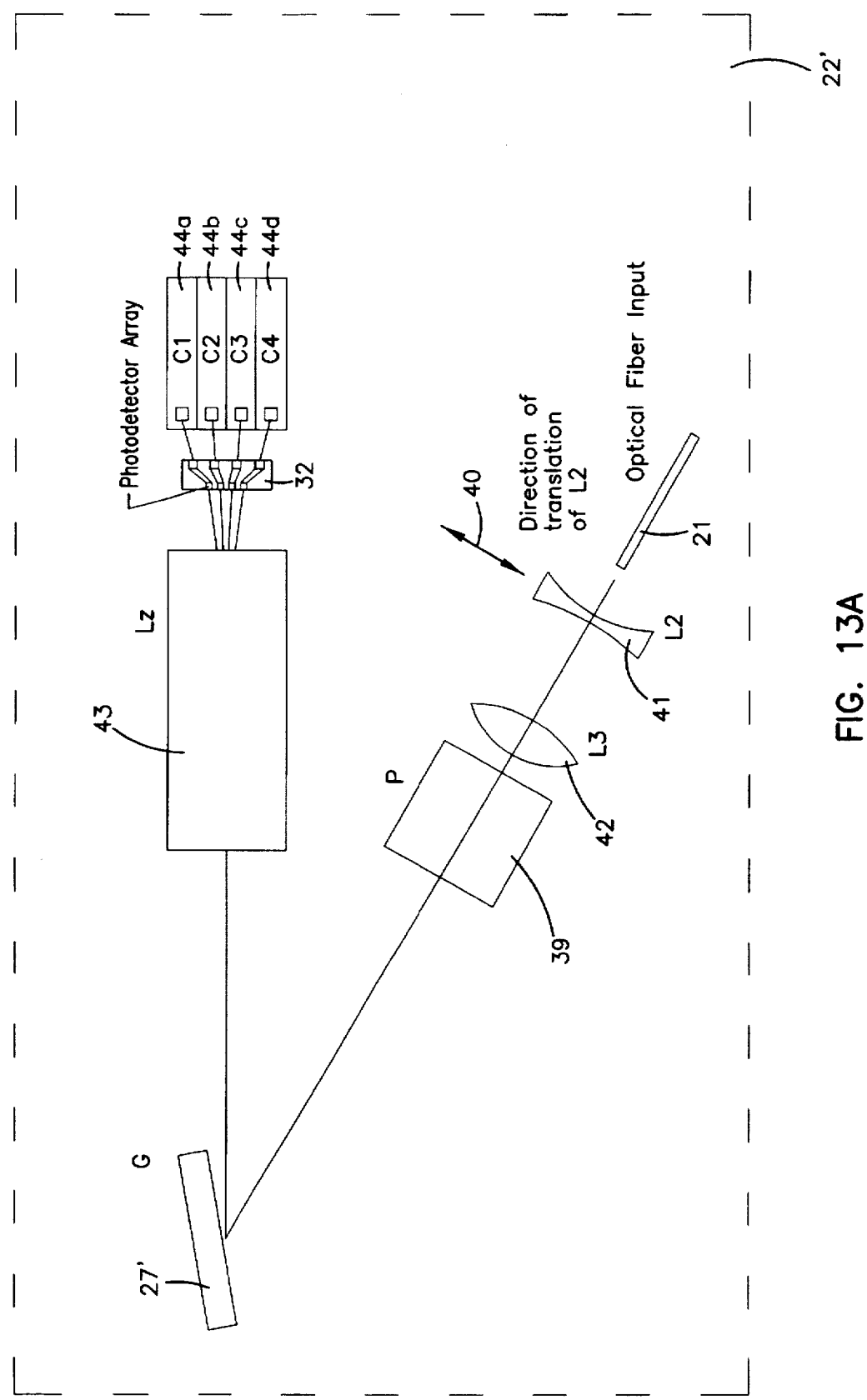
FIGS. 13a and 13b are diagrammatic illustrations of the tunable optical receiver for high density WDM fiber optic communication systems.

Turning now to FIG. 13a, the optical fiber 21 is shown with lenses $L_2$ 41 and $L_3$ 42 which together comprise a lens array providing for the tuning of the light waves about wavelength $\lambda_c$. A polarizing beamsplitter and half-wave plate 39 is used to align the polarization of the collimated light beam perpendicular to the grating groove direction of the light diffraction grating 27'. The diffracted beams are then focused by zoom lens 43 onto the photodetector array 32.

In order to more clearly describe the present invention, the tunable receiver and operation of the device will be deferred pending a discussion of the various elements of the modulator section of the invention.

A. Multi-longitudinal Mode Laser 26

Figure 2A:
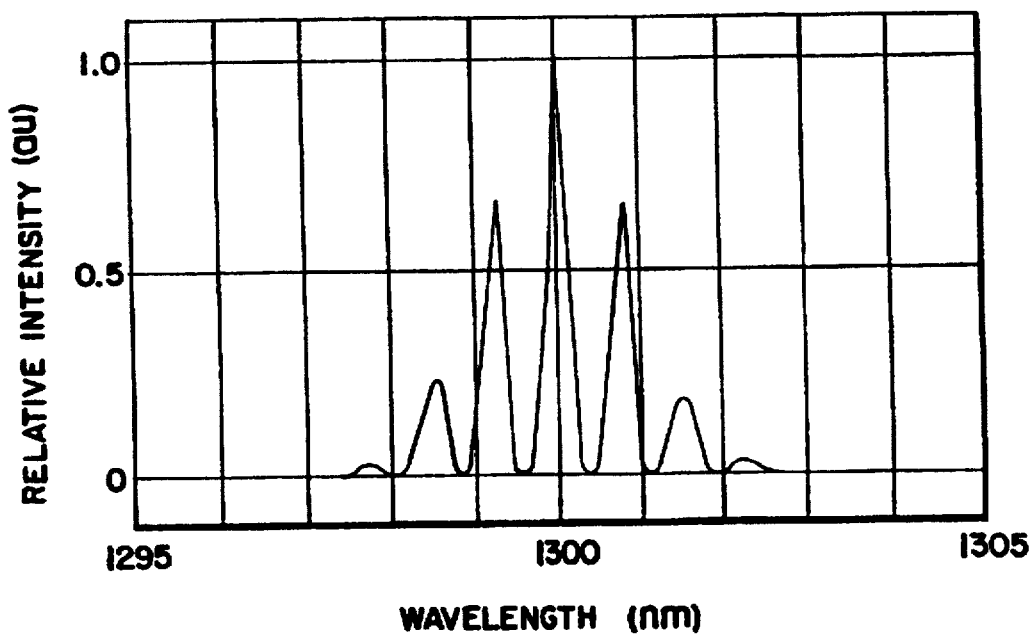
FIG. 2a is a diagrammatic illustration of the longitudinal mode spectra of a semi-conductor laser with a Fabry-Perot structure.

Referring again to FIG. 1, preferably, the WDM system 26 utilizes very closely spaced optical wavelengths. A series of closely spaced optical wavelengths centered about 1.3 microns or 1.55 microns wavelength can be produced with a conventional semiconductor diode laser 26. FIG. 2a shows a typical optical spectra and line widths of a laser diode with a Fabry-Perot structure. The wavelength separation between the longitudinal modes is $\delta w=0.0007$ microns=7 Å.

By using a single multi-longitudinal mode laser, the wavelength spectral separation of the carrier beams remains fixed. However, since the entire longitudinal mode pattern can shift at a rate of 0.0005 microns=5 Å per degree Centigrade (C) temperature variation, stable and accurate temperature control of the laser diode 26 is required. Laser diode temperature controllers are commercially available which can be used to stabilize the laser output with respect to temperature induced spectral shifting. These temperature controllers offer 0.2 degrees C accuracy with 0.01° C. stability (e.g., the model LDT-5412 temperature controller by ILX Lightwave of Bozeman, Montana). Thus, the semiconductor laser output could be stabilized to reduce spectral shifting to <<0.05 Å wavelength. As noted above, the laser power and temperature circuitry functional block is illustrated at 23.

Figure 2B:
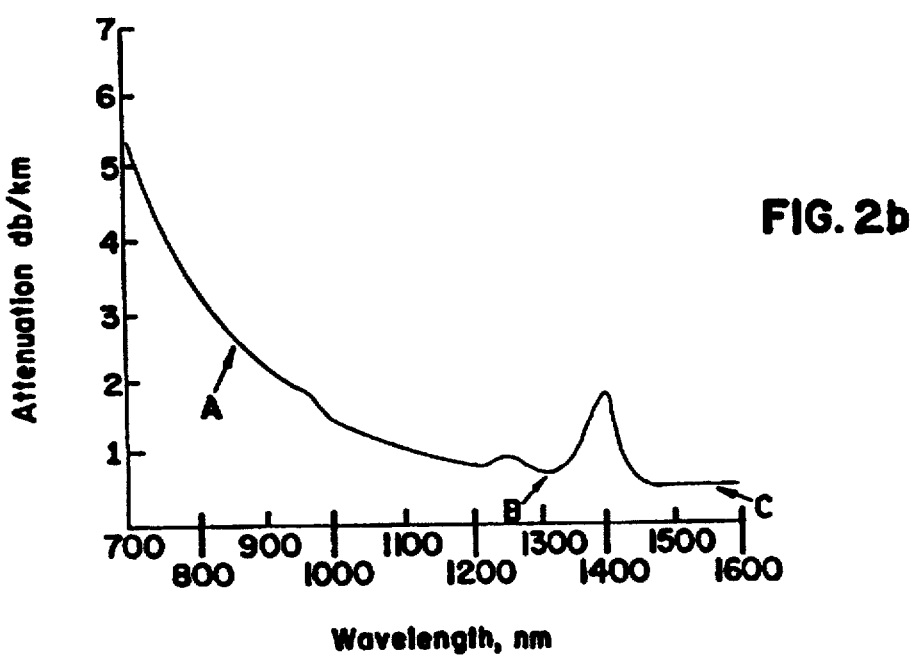
FIG. 2b is a diagrammatic illustration of typical absorption characteristics of an optical fiber.

FIG. 2b illustrates the absorption characteristics of an optical fiber which illustrates the first window (designated at "A"), the second window (designated at "B"), and the third window (designated at "C").

B. Diffraction Grating 27

Figure 3:
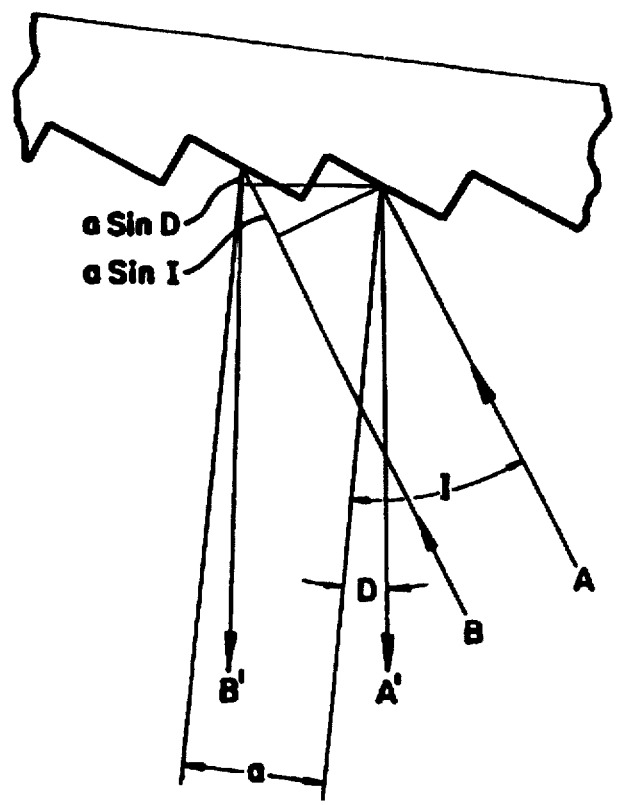
FIG. 3 is a diagrammatic cross-section of a diffraction grating and illustrating the angles of incidence (I) and diffraction (D), and the grating groove spacing (a) are illustrated.

A diffraction grating is used to spatially separate light of different wavelengths (i.e., to disperse light). Referring to FIG. 3, a typical diffraction grating consists of a substrate 40 with a large number of parallel grooves 41 ruled or replicated in its surface and overcoated with a reflecting material such as aluminum. Referring to the grating geometry shown in FIG. 3, the grating equation relating the angle of incidence I of the incoming light to the angle D at which the diffracted light exits is:

$$a(\sin D + \sin I) = m\, w,$$

where a=groove spacing,
w=wavelength of light, and
m=an integer.

Figure 4:
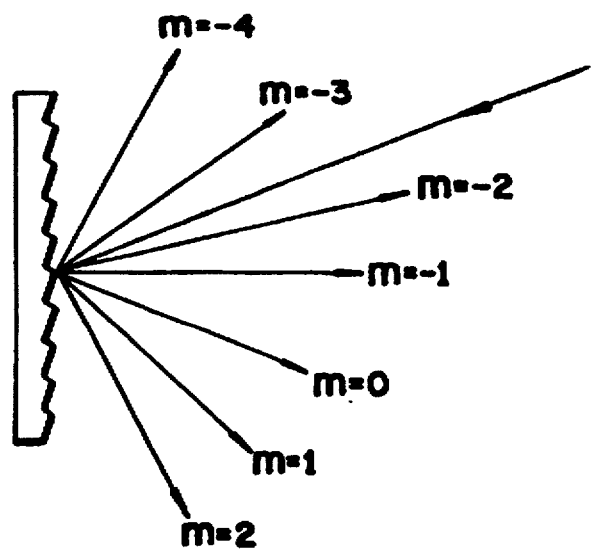
FIG. 4 is an illustration of the diffraction of monochromatic light into different orders m.
Figure 5:
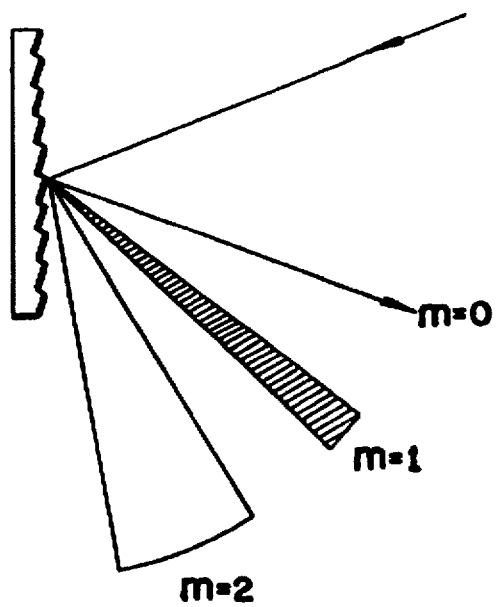
FIG. 5 is an illustration of the diffraction of polychromatic light and the dispersion of the different wavelength components over an angular region for each of the diffraction orders m>1.

When a parallel beam of monochromatic light is incident on a grating, the light is diffracted from the grating in directions corresponding to m=0, 1, 2, etc., as shown in FIG. 4. If polychromatic light is incident on the grating, then each wavelength is diffracted into a different angular direction to form a fan of light for each order m, as shown in FIG. 5.

The resolving power R of a grating is defined in terms of wavelengths w and w+δw, where w+δw is the closest wavelength to w which can be resolved. The resolving power is given by:

$$R = w/\delta w = m N$$

where N is the number of grating lines illuminated. To resolve a wavelength separation of $\delta w = 0.0007$ microns (i.e., the longitudinal mode separation achievable with a semiconductor laser), the number of grating lines which must be illuminated for m=1 is:

$$N = 1.3/0.0007 = 1857$$

Therefore, if the laser beam diameter is 0.3 cm, then the grating groove spacing must be:

$$a = 0.3/1857 = 0.00016 \text{ cm}$$

This groove spacing corresponds to 6190 grooves per cm. Gratings with this number of grooves per cm are commercially available.

If monochromatic light strikes a grating, a fraction of it is diffracted into each order m. Gratings are not equally efficient at all wavelengths. The efficiency can be tuned by changing the groove facet angles, or shape and depth. The optimization of efficiency by appropriate groove shaping is known as blazing. In the present invention, the angles I and D, together with the grating blaze angle, are determined by the required spatial separation between the integrated optic modulator 31 input ports for the different wavelengths.

C. Collimating 28 and Focusing 29 Optics

Referring again to FIG. 1, components 28 and 29 must be specified to yield both the required linear dispersion of the laser longitudinal mode wavelengths at the waveguide input face, and also the required laser beam spot size at the waveguide input face. The linear dispersion achieved with the diffraction grating 27 must be great enough to enable spatial location of the different longitudinal modes on the input coupling face of several different optical modulators. Also, the collimated laser beam must be appropriately shaped to optimize the input coupling efficiency to the integrated optic waveguide modulator 31. The focused laser beam spot size must match the guided wave mode profile to achieve good input coupling efficiency.

Since the cross-section of the guided light beam in the integrated optic waveguide has more of an elliptical shape, the optical beam incident on the second optical element must also have an elliptical cross-section. However, the spatial direction of the major and minor axes are reversed for the collimated input beam and the guided beam.

To satisfy these requirements, optical elements 25, 28, and 29 can be selected as follows:

1. Collimating element: focal length=8 mm, N.A.=0.5.
2. Focusing element: focal length=8 mm, N.A.=0.5.

Figure 6:
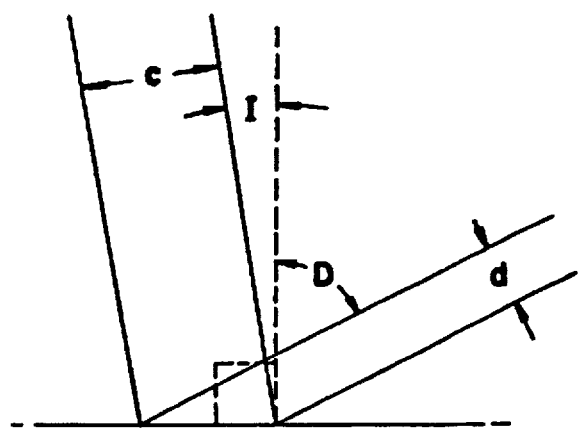
FIG. 6 is a diagrammatic illustration of the ratio of the beam widths d/c equals the anamorphic magnification.

The elliptical beam shape required for efficient input coupling to the waveguide is established upon diffraction of the laser beam by the holographic grating 27. As shown in FIG. 6, the laser beam cross section undergoes an anamorphic magnification upon diffraction. The laser beam diameter which lies in the plane defined by the incident beam and the diffraction grating normal, is changed according to:

$$d = c(\cos D/\cos I)$$

For the specified holographic grating, the anamorphic magnification is:

$$d/c = \cos 77°/\cos 37° = 0.28$$

Design calculations for the waveguide design for the directional coupler 31 indicates that the guided beam is elliptically shaped with a minor axis to major axis ratio of about 0.23.

Collimating optical element 29' in FIG. 1 must collimate the light exiting the multi-mode optical fiber 21 to permit separation of the modulated laser diode longitudinal modes by the holographic grating 27' at the receiver. The angular divergence of the collimated beam formed by element 29' must be less than the angular dispersion of the longitudinal mode wavelengths upon diffraction by the holographic grating 27'. For an extended source, such as the output of a 100 micron diameter optical fiber, the full divergence angle of the collimated beam formed by element 29' is:

$$\Phi_{CB} = (\text{fiber diameter})/f_{OE3}$$

where $f_{OE3}$ is the focal length of element 29'. The angular dispersion between two adjacent longitudinal modes achieved with the grating specified for the WDM optical modulator is:

$$\delta D = \delta w/(a)(\cos D)|$$

$$\delta D = 9 \times 10^{-8}/[(1/12000)(\cos 77°)]$$

$$\delta D = 4.8 \times 10^{-3} \text{ radians}$$

To obtain $\delta D > \Phi_{CB}$, the focal length of OE must be:

$$f_{OE3} > 2.1 \text{ cm}.$$

A lens with a focal length of 10 cm was used for focusing lens 28' in FIG. 1. This lens 28' focused the dispersed longitudinal mode wavelengths to spots easily resolved with a video camera during experimentation. In application, however, a detector array 32 will be used to monitor the dispersed longitudinal modes, and focusing lens 28' is selected to provide the proper spot size and separation.

D. Integrated Optic Modulator 31

Figure 7:
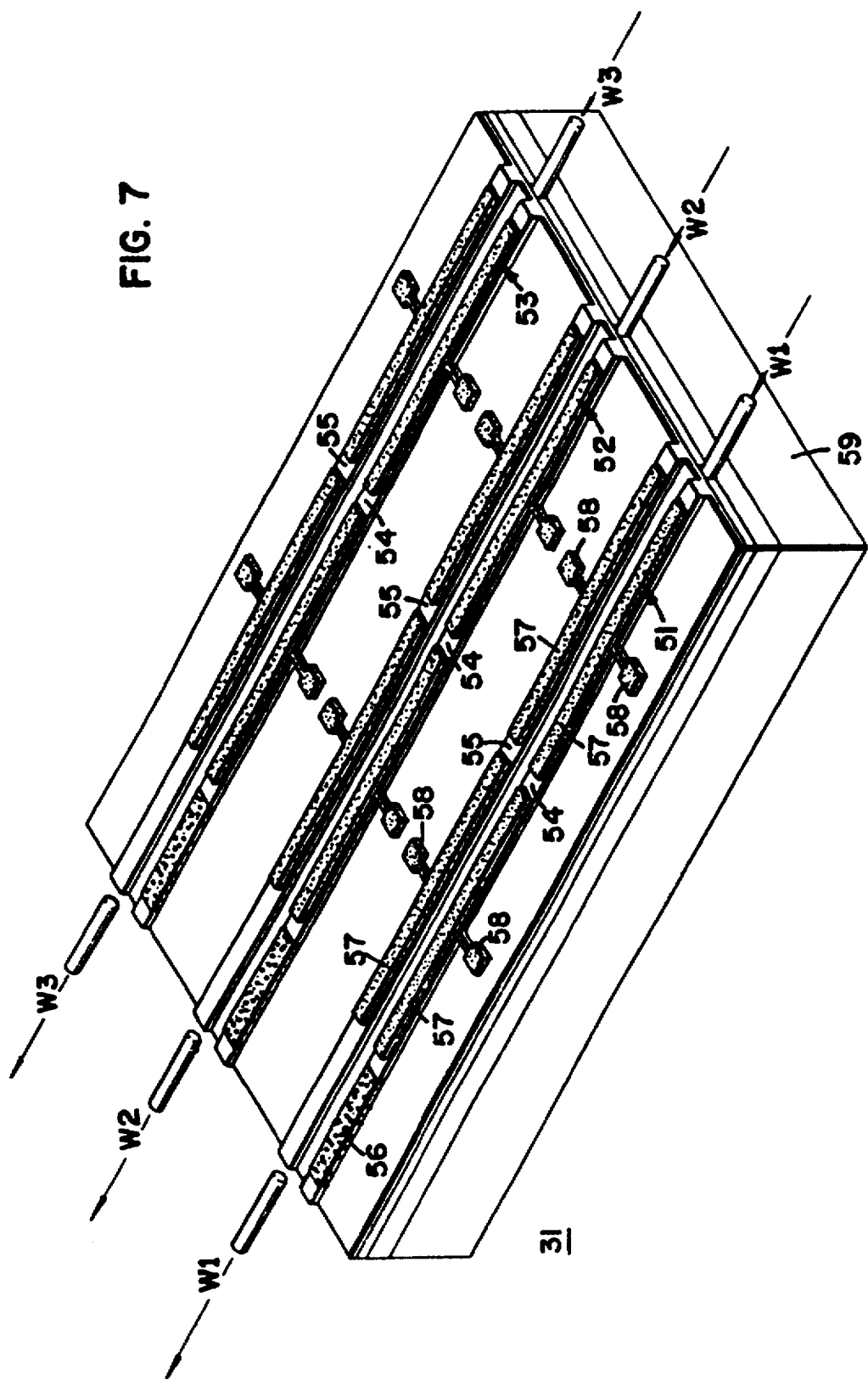
FIG. 7 is a diagrammatic illustration of the integrated optic device chip with three optical intensity integrated optic modulators based on directional couplers.

Referring to FIGS. 1 and 7, the integrated optic device 31 utilized in the preferred embodiment incorporates three separate optical intensity modulators 51, 52, 53. However, the number of optical intensity modulators incorporated on the integrated optic device chip could be increased to match the number of high intensity longitudinal modes in the laser diode 26 output beam. The lateral separation of the modulator structures on the integrated optic chip must:

1. match the spatial separation of the focused input beams, and
2. be sufficiently separated to avoid crosstalk among the modulators.

To meet these requirements, the preferred modulator 31 is based on a directional coupler integrated optic structure. FIG. 7 illustrates the modulator structure. Each modulator 51, 52, 53 includes two parallel channel waveguides 54 and 55. Since each modulator is constructed in a similar manner to one another, it will be appreciated that when referring to modulator 51, the structure of modulators 52 and 53 is equivalent and so they will not be described further herein.

The waveguide 54 and 55 is a multilayer structure of GaAs and AlGaAs epitaxial films. Ridges are etched into the cover clad layer of the multilayer waveguide to define the channel guides. A semiconductor pin heterojunction in the multilayer waveguide permits application of a signal electric field within the region where the guided light propagates. Through the electro-optic effect, this signal electric field modulates the waveguide propagation constant, enabling control of the coupling coefficient between the two channel guides 54 and 55 of the modulator 51.

Modulator chip 31 includes a substrate 59 and includes electrodes 57 which overlay the channel waveguides 54 and 55. Electrical contact pads 58 are provided for each of the electrodes 57. The external modulator controller block 24 is operatively connected to the electrical contact pads 58 in order to modulate the light so as to impose the desired information, data, or other signals into the light beam for subsequent transmission to receiver block 22.

In operation, light from the laser diode 26 is coupled into the waveguide 54 with a light absorbing region 56. The length of the ridge guides 54, 55 is such that the light couples from ridge guide 54 to ridge guide 55 in propagating the length of the guide. Therefore, the light exits guide 55 when no signal voltage is applied to the semiconductor pin heterojunction in the ridge guide. By applying a voltage to the heterojunction, the coupling between guides 54 and 55 is modified so that less light couples to guide 55 and exits the modulator chip. Guided light which is not coupled from guide 54 to 55 is absorbed by a thin film coating covering the light absorbing region 56 at end of ridge guide 54. Thus, the intensity of the light exiting ridge guide 54 is modulated by the signal voltage applied to the semiconductor pin heterojunction. The directional coupler modulators are sufficiently separated on the integrated optic device chip to permit independent modulation of the three wavelengths $W_1$, $W_2$, and $W_3$ (see FIG. 7).

Design details such as:

1. doping levels in the semiconductor pin heterojunction,
2. electrode configuration,
3. device length, and
4. channel guide separation can be specified for the preferred operation at a wavelength of 1.3 microns. However, it will be appreciated by those skilled in the art that the integrated optic device 31 could also be designed for use at other laser diode wavelengths. Also, electro-optic materials other than AlGaAs could also be used. For example, if $LiNbO_3$ is used for the electro-optic waveguide material, then the electrode configurations are different from that used for semiconducting AlGaAs—so as to reflect the ferro-electric nature of $LiNbO_3$.

E. Epitaxial $Al_xGa_{1-x}As$ Deposition and Device Microstructure Fabrication

The WDM optical modulator waveguide structure can be deposited on GaAs substrates using molecular beam epitaxy (MBE) or metal organic vapor phase epitaxy (MOVPE). Both p type and n type dopants can be added to the AlGaAs material during growth of the epitaxial layers.

The ridge waveguides and electrode are fabricated using standard photolithography techniques, thin film deposition techniques, and wet chemical and reactive ion etching techniques.

F. WDM Optical Modulator Fabrication Process Using AlGaAs Semiconductor Material Device processing involves the following basic steps set forth in TABLE 1:

TABLE 1

1. fabricating an electrical contact to the substrate clad layer;
2. defining the channel waveguides 54 and 55 by etching a ridge in the cover clad layer;
3. fabricating the optical attenuator region 56 at the end of the one guide 54 in each directional coupler 51, 52, 53;
4. forming a planarizing layer over the cover clad layer; and
5. fabricating the metal electrodes 57 on the channel waveguide, the metal contact pads 58, and the metal interconnects between the channel guide electrodes and the contact pads.

An electrical contact must be made to both the cover clad layers and the substrate clad layers in order to reverse bias the pn junction in the multilayer AlGaAs semiconductor waveguide structure. Fabricating an electrical contact to the substrate clad layer involves etching a via through both the cover clad layer and the guide layer. Once the substrate clad layer is exposed at the via cut, a metal contact pad is fabricated using photolithography lift off techniques and thin film deposition processes.

Channel waveguides 54, 55 are then defined in the multilayer, planar waveguide film structure using photolithography and reactive ion etching (RIE) procedures. An optical attenuator region 56 is formed at the end of one channel waveguide in each directional coupler modulator 51, 52, 53 by etching away the ridge and depositing a film of an absorbing material over the etched region.

The coverclad surface is then planarized by depositing a thick photoresist layer which is hard baked at about 210° C. to form a hard, durable, polymer layer. The photoresist layer is patterned to provide openings to the coverclad layer at the channel guides prior to the high temperature hard bake. Thin metal film deposition techniques and photolithography techniques are then used to fabricate (1) electrodes 57 to the cover clad layer of the channel guides (2) electrical contact pads 58 on the photoresist planarizing layer, and (3) electrical interconnects between the electrodes 57 and the contact pads 58.

G. Tunable Optical Receiver

A preferred optical receiver 22' for wavelength division multiplexed (WDM) fiber optic communication apparatus and method provides for two significant features. First, wavelength tuning is provided to accommodate either multi-longitudinal mode laser diodes or distributed feedback (DFB) laser diode arrays, which are centered at different wavelengths $\lambda_c$ in the optical fiber transmission band. Second, magnification of the spatial dispersion of the focused laser beams at the photodetector array is provided to accommodate different wavelength separation $\Delta\lambda$ between the carrier wavelengths $\lambda_i$ the WDM system.

Figure 13B:
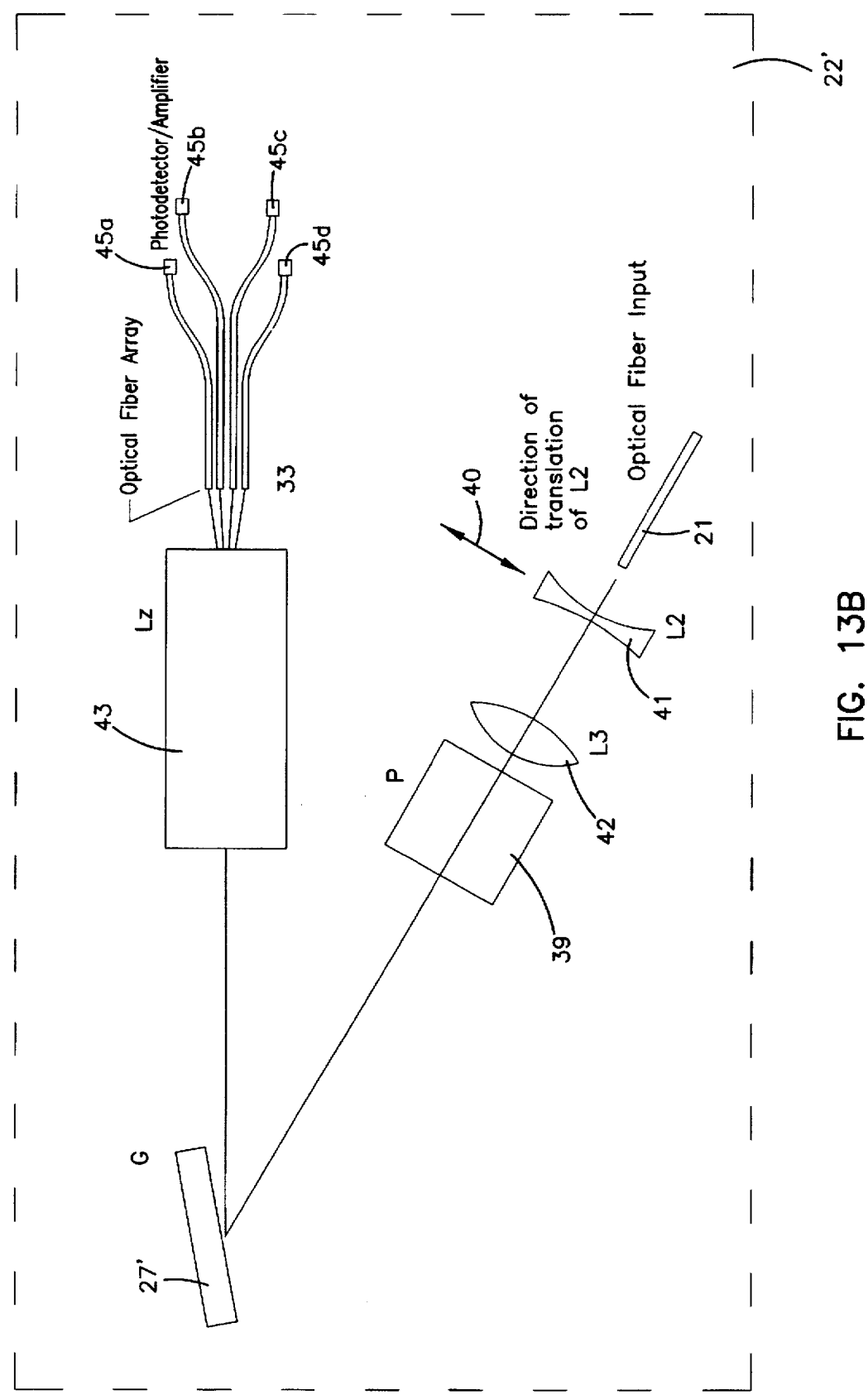

FIGS. 13a and 13b illustrate preferred embodiments of the optical receiver. Light exiting the optical fiber 21 is first collimated by the collimating optics, lenses 41 and 42. A polarizing beamsplitter and a half wave plate 39 are used to align the polarization direction of the collimated light beam perpendicular to the grating groove direction (i.e., p polarization at the grating) of diffraction grating 27'. The different wavelengths in the collimated laser beam are then spatially separated by the diffraction grating 27'. Each wavelength $\lambda_i$ is diffracted into a different angular direction. The zoom lens assembly 43 focuses each of the dispersed wavelengths $\lambda_i$ onto a different photodiode in the photodetector array 32 ("PDA") in FIG. 13a, or onto the end face of a different optical fiber in the optical fiber array 33 in FIG. 13b. While four photodetectors and four optical fibers are shown in FIGS. 13a and 13b, respectively, it will be apparent that any number of photodetectors or optical fibers can be used, corresponding to the number of multiplexed wavelengths. The output of each photodetector 32 in FIG. 13a is fed to an electronic circuit $C_i$ (designated 44a–44d) for amplification. The electronic circuits 44a–44d also condition the signals for proper interfacing to communication system electronic components 25 (best seen in FIG. 1). In FIG. 13b, each of the optical fibers 33 are terminated at a photodetector/amplifier 45a–45d which also conditions the signal for proper interfacing to communication system electronic components 25. The elements illustrated in optical receiver block 22', excluding the photodetector array and electronic circuits in FIG. 13a, and excluding the optical fiber array and photodetector/amplifier in FIG. 13b, comprise an optical demultiplexer. In FIG. 13a, the optical receiver block 22' includes the optical demultiplexer, a photodetector array 32, and electronic amplifiers 441–44d. In FIG. 13b, the optical receiver 22' includes an optical demultiplexer, an optical fiber array 33, photodetectors 45a–45d and electronic amplifiers.

It will be appreciated by those skilled in the art that the wavelength tuning means comprised of the lens assembly 41 and 42 (e.g., $L_2$ and $L_3$) provides for tuning of the receiver 22' to accommodate changes in the center wavelength $\lambda_c$ of the WDM system by changing the angle of incidence of the light at the diffraction grating. For example, if:

$$\lambda_1, \lambda_2 = \Delta\lambda + \lambda_1, \lambda_3 = 2\Delta\lambda + \lambda_1,$$

and $$\lambda_4 = 3\Delta\lambda + \lambda_1$$

are the wavelengths of the WDM system, then:

$$\lambda_c = (\tfrac{1}{4})\Sigma\lambda_i = \lambda_1 + 1.5\Delta\lambda.$$

The wavelength range of the multi-longitudinal mode laser diode emission pattern varies so that $\lambda_c$ will be different for each laser diode. With DFB laser diode arrays, the WDM wavelengths $\lambda_i$ may eventually be standardized, but $\lambda_c$ may vary depending on which consecutive set of $\lambda_i$ are used.

In the preferred embodiment receiver 22', lens $L_2$ 41 is preferably a concave lens and lens $L_3$ 42 is a convex lens. A lateral translation of $L_2$ (along the path designated 40) "tilts" the input beam entering lens $L_3$ 42, causing a small change in the angular direction of the output collimated beam exiting lens $L_3$ 42. This change in angular direction of the collimated light beam changes the incidence and diffraction angles at the grating 27'. The diffraction angle is changed until the new value of $\lambda_c$ (i.e., set of $\lambda_i$) is aligned with the optic axis of the zoom lens 43 and focused at the photodetector sites 32 (or optical fiber sites 33, best seen in FIG. 13b).

It will also now be appreciated that the spatial separation $\Delta\lambda = \lambda_2 - \lambda_1$ between two adjacent wavelengths of the WDM system will depend on the Fabry Perot cavity length of the multi-longitudinal mode laser diode. With the DFB laser diode array, $\Delta\lambda$ may be standardized to a value or values which depend on the control and yield of the DFB laser fabrication process. Therefore, the zoom lens assembly $L_z$ 43 can adjust for different values of $\Delta\lambda$ by adjusting the magnification of the focused laser beam spot pattern at the photodetector array 32 (or the optical fiber array 33). This results in a magnification means for physically increasing the spatial dispersion of the focused wavelengths.

In Operation

In use, the preferred wavelength division multiplexer and optical modulator is a building block on which new telecommunication system architectures can be developed. These new telecommunication system architectures will distribute large amounts of information throughout the network. Wavelength division multiplexing and high speed external modulation of the laser light provide for the generation of the large bundles of information.

The operation of the transmitter portion 20 will be next described. First, the laser diode 26 is maintained at a constant temperature to minimize wavelength variations by temperature and power control block 23. Second, the output beam from the laser diode 26 is directed to collimating lens 28. The output of lens 28 is reflected off of mirror 30 to diffraction grating 27. The diffraction grating 27 spatially orients the differing wavelengths of light apart from one another. As utilized herein, this may be referred to as "physically" separating the wavelengths of light. It will be appreciated by those skilled in the art that other devices which separate differing wavelengths from one another, such as prisms, might also be used. The physically separated wavelengths are in turn provided to collimating lens device 29 for injection into the external modulator 31.

Voltages are applied to pads 58 of the modulator 31 by controller block 24 in accordance with predetermined control signals to either attenuate or propagate the differing wavelengths of light through each of modulators 51, 52, or 53. Accordingly, differing modulated signals are provided to a transmission guide 21 which is preferably a multi-mode optical fiber. Accordingly, large bundles of information may be provided over single optical fibers. A receiver 22 (or 22') receives the differing wavelengths at collimating device 29' which is provided to diffraction grating 27' and collimating lens 28' (or zoom lens 43 as shown in FIG. 13). The information transmitted by the resulting physically separated modulated wavelengths are detected by detector array 32 and the detected information from the plurality of wavelengths is gathered by detector array control device 25 (or through preprocessor means 44–47) for further processing, transmission, and/or storage.

Controller block 24 can be either a general purpose computer (e.g., a personal computer) with appropriate interface boards or may be a special purpose communications device or computer. Similarly, detector array control device 25 can also be either a general purpose computer with appropriate interface boards or may be a special purpose communications device or computer.

Alternative Embodiments

Figure 8:
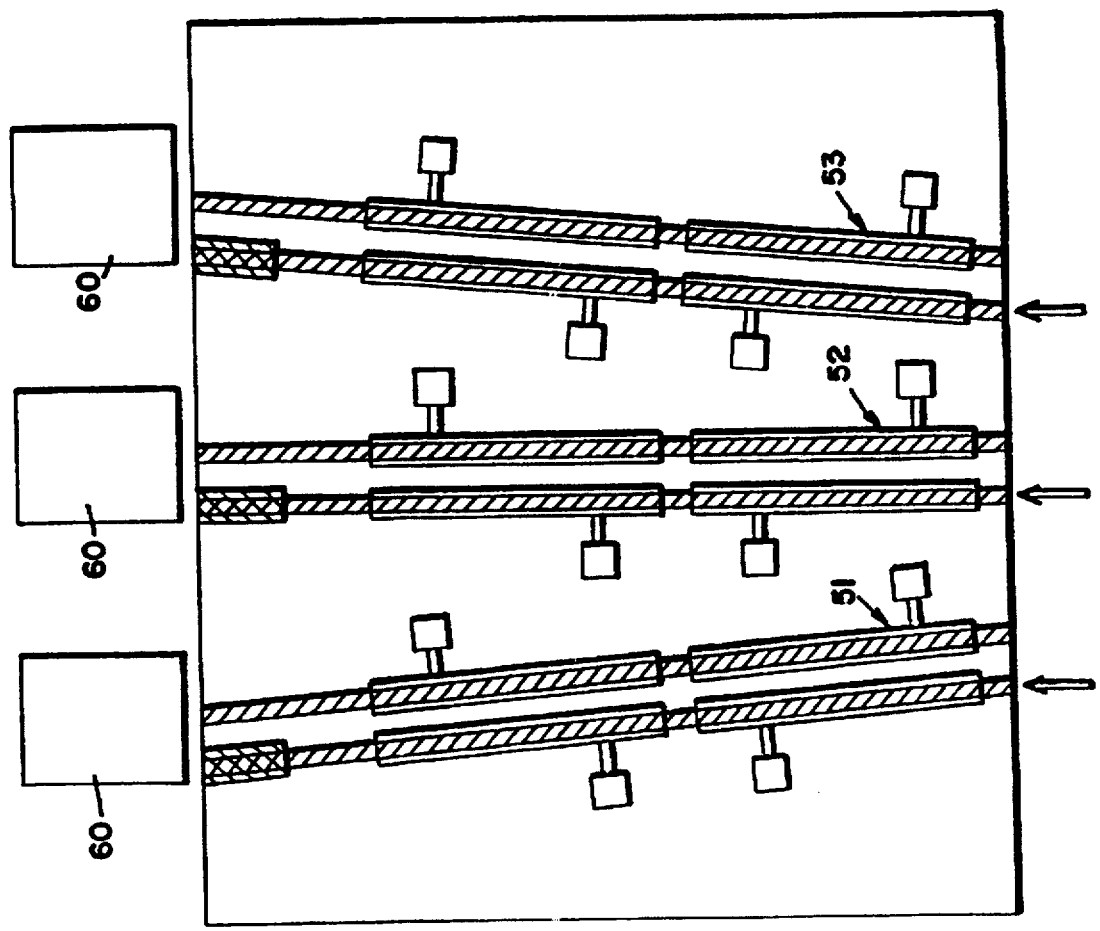
FIG. 8 is a diagrammatic illustration of a first alternative embodiment of the modulator of FIG. 7, wherein single mode optical fibers are butt coupled.

Turning now to FIG. 8, a first alternative embodiment modulator 31' is illustrated wherein the exiting output beams are butt-coupled to single mode optical fibers 60. These single mode optical fibers 60 can subsequently be combined into a one single mode optical fiber or can carry the modulated information individually.

Figure 9:
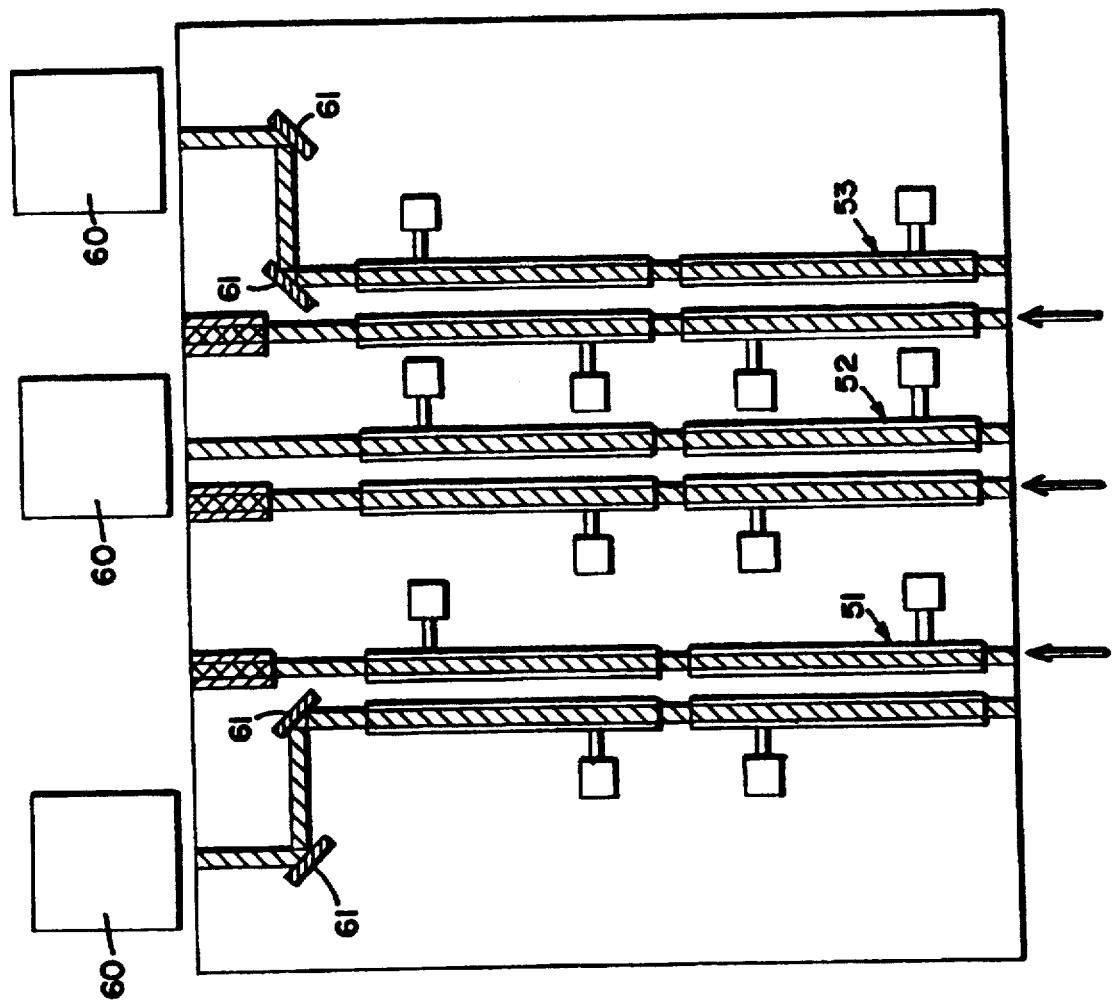
FIG. 9 is a diagrammatic illustration of a second alternative embodiment of the modulator of FIG. 7, wherein single mode optical fibers are butt coupled.

FIG. 9 illustrates a second alternative embodiment, wherein the channel waveguides 51 and 53 are not angled to provide more spacing between the exit area (as shown in FIG. 8), but instead the waveguides 51 and 53 are offset through use of reflective devices 61 to exit into butt-coupled single mode optical fibers 60.

Figure 10:
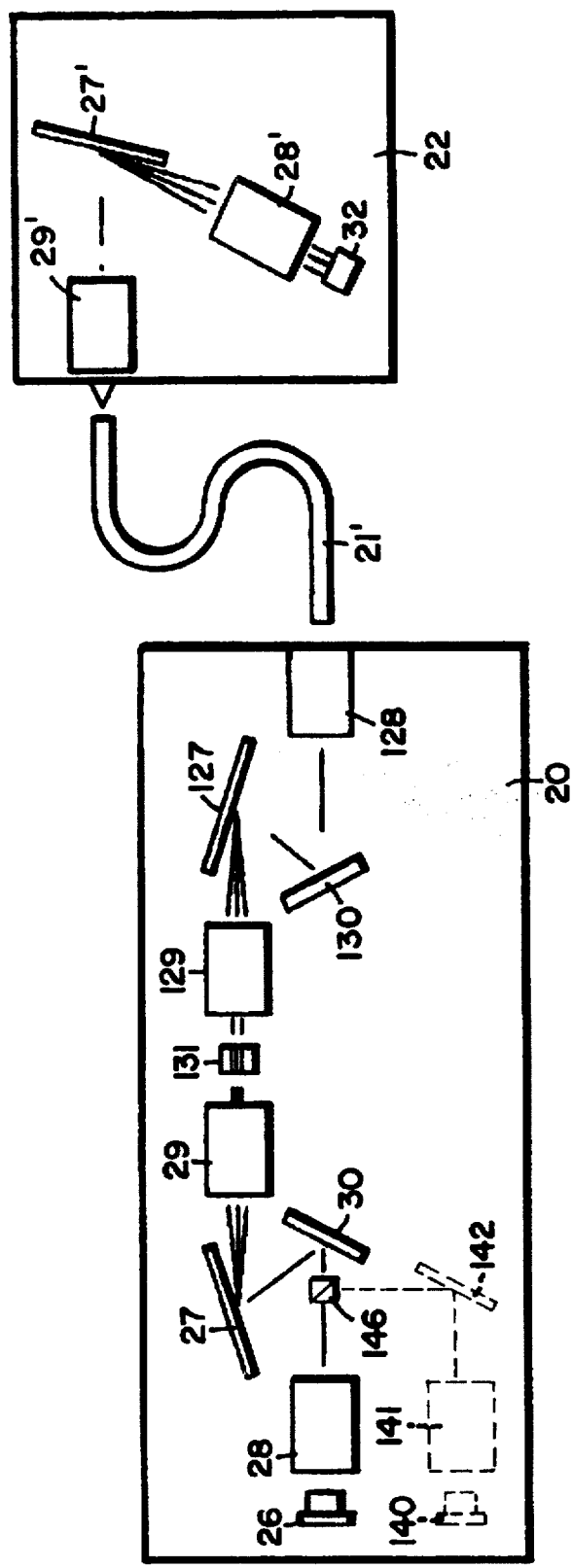
FIG. 10 is a diagrammatic illustration of a third alternative embodiment for coupling a plurality of different wavelengths into a single mode optical fiber.

FIG. 10 illustrates a third alternative embodiment for coupling the plurality of optical signals of different wavelengths into a single mode optical fiber 21'. After exiting the integrated optic modulators 131, the spatially separated beams of different wavelength are collected by lens 129 which collimates and refracts the beams so as to overlap at the site of diffraction grating 127. The collimated beams (each of different wavelength and different angular propagation direction) are diffracted by holographic grating 127 so that the collimated beams propagate parallel to each other. The beams are reflected from mirror 130 onto lens 128. This lens 128 has a numerical aperture that closely matches that of the optical fiber 21' and is used to image the collimated and parallel beams onto single mode optical fiber 21'. It will be appreciated by those skilled in the art that the focusing means (comprised of the diffraction grating 127, mirror 130 and lens 128 in the preferred alternative embodiments) allow the present invention to be utilized in connection with a single mode optical fiber 21'.

FIG. 10 also illustrates the use of a plurality "n" of laser diodes (i.e., light sources) and use of "m" wavelengths wherein m>n. Second diode 140 generates light which is collimated by lens 141 and reflected from mirror 142 to beam combiner 146. From there, the combined beams are reflected from mirror 30 onto diffraction grating 27.

Figure 11A:
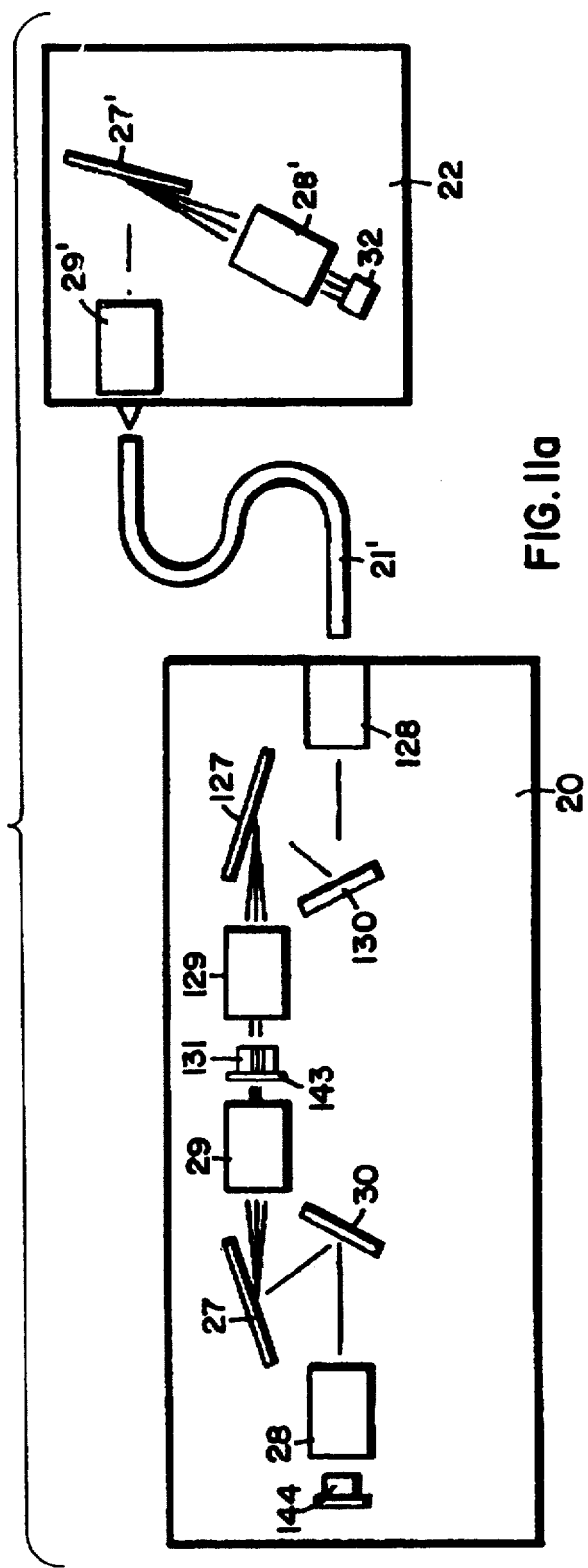
FIG. 11a is a diagrammatic illustration of a fourth alternative embodiment which includes a light emitting diode (LED) as the light source, wherein the LED emits a continuous spectrum of light with a broad spectral width.
Figure 11B:
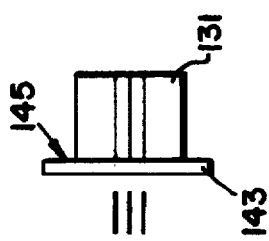
FIG. 11b is an enlarged diagrammatic illustration of the substrate with thin film slit apertures.
Figure 12:
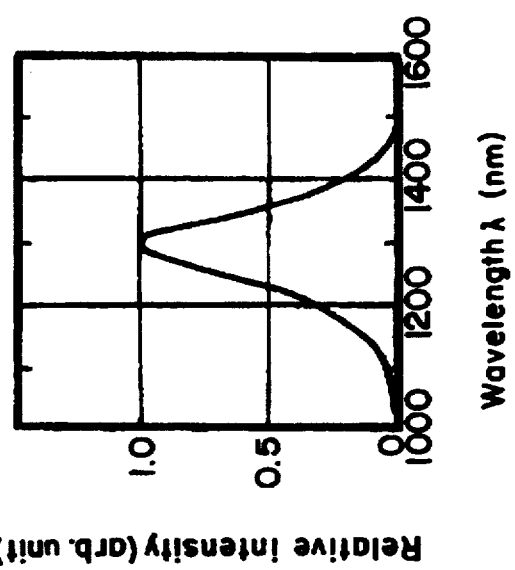
FIG. 12 is a representative graph showing the emission spectra of a light emitting diode (LED)

FIG. 11 illustrates a fourth alternative embodiment for generating a plurality of optical signals of different wavelengths. A light emitting diode (LED) 144 is used as the source of the electromagnetic radiation (i.e., light). The LED 144 emits a continuous, broad band spectrum of light. A representative illustration of the spectrum of an LED is shown in FIG. 12. As with the laser diode light source 26, a diffraction grating 27 is used to disperse the continuous spectrum of emitted light, so that each wavelength propagates in a different angular direction. The dispersed spectra is imaged onto an input edge 145 of the integrated optic modulator device chip 131 by lens 29. A transmitting substrate (e.g., glass) with a thin metal film 143 patterned to define apertures at the sites of the input channel guides, is placed at the input edge 145 of the integrated optic modulator device chip 131. Therefore, only the narrow spectral bands δw which are dispersed into the angular range which subtends the metal film apertures is coupled into the channel waveguides. The remaining components of the WDM optical modulator 20 are similar to those discussed above in connection with implementations utilizing multi-longitudinal mode laser diodes 26.

It will be appreciated by those skilled in the art that the integrated optical modulator 131 of the third and fourth alternative embodiments may be constructed in accordance with modulator 31 described above.

As noted above, FIGS. 13a and 13b illustrate embodiments providing for tuning of the receiver to accommodate changes in the center wavelength $\lambda_c$ of the WDM system and wavelength separation between two adjacent wavelengths. First, light exiting the optical fiber 21 is provided to collimating lens assembly $L_2$ (41) and $L_3$ (42). Lens $L_2$ 41 may be adjusted in a plane generally perpendicular to the path of light exiting the collimating lens assembly 41 and 42. The plane is designated by the reference number 40 (and is generally perpendicular to the plane of FIGS. 13a and 13b). Light exits lens $L_3$ 41 onto diffraction grating 27'. Movement of lens 41 adjusts the incidence angle of the light at the diffraction grating 27'. Exiting diffraction grating 27' the light enters zoom lens $L_z$ 43, the adjustment of which focuses the spatially separated beams onto a photodetector array 32. In the preferred embodiment, the zoom lens $L_2$ 43 is a "compact zoom" lens manufactured by the assignee of the present invention. It has a focal length 18-87 millimeters and a spectral band of 1.3 to 1.55 nanometers. However, these parameters may be changed depending on the wavelength of the laser. In the preferred embodiment, the zoom lens 43 is tunable for a $\Delta\lambda$ of 1 nm to 4 nm. Therefore, the zoom lens 43 can correct for variations in the wavelength, such that the spatial separation of separated beams falls onto the photodetector array 32 (or the optical fiber array 33) with the proper spacing (e.g., 250 microns center-to-center spacing). The output from the photodetector array is provided to controller block 24 (or preprocessing circuits 44a–44d).

It will be appreciated that the option to use an optical fiber array 33 at the site of the photodetector array 32 permits the use of fiber to the desk or to the end-use point after wavelength demultiplexing the optical signal. Each fiber transmits a single wavelength to a photodetector at each terminal on that line. Element 39 is included to reduce polarization dependent loss at the diffraction grating 27'. Since the diffraction efficiency is much greater for p polarization than it is for s polarization, element 39 includes a polarization beamsplitter and a half wave plate to transform all the light exiting the optical fiber to p polarized light at the diffraction grating 27'.

The polarizing beamsplitter and half wave plate element 39 is configured as a rhomboid prism which splits the incoming beam into two parallel propagating beams at the exit faces of the prism. The two beams are polarized 90° relative to each other at the exit faces. The half wave plate at the exit face for the s polarized beam rotates the polarization so that both beams are p polarized relative to the beamsplitter surface and the diffraction grating surface. The diameter of the collimated beam propagating from element 39 to the diffraction grating 27' is thus greater in the direction defined by the incident plane at the diffraction grating 27' than in the direction perpendicular to this plane. However, upon diffraction at the grating 27', the beam undergoes an anamorphic magnification which reduces the beam diameter in the direction defined by the plane of incidence at the diffraction grating 27'. The cross section of the beam diffracted to the zoom lens 43 is then more closely circular in shape.

It will be appreciated that the principles of this invention apply not only to the circuitry used to implement the invention, but also to the method in general of automatically utilizing the plurality of wavelengths to transmit information over a single fiber optic device.

While a particular embodiment of the invention has been described with respect to its application, it will be understood by those skilled in the art that the invention is not limited by such application or embodiment or the particular circuits disclosed and described herein. It will be appreciated by those skilled in the art that other circuit configurations that embody the principles of this invention and other applications therefor other than as described herein can be configured within the spirit and intent of this invention. The circuit configuration described herein is provided as only one example of an embodiment that incorporates and practices the principles of this invention. Other modifications and alterations are well within the knowledge of those skilled in the art and are to be included within the broad scope of the appended claims.

what is claimed is:

1. An apparatus for receiving and decoding a plurality of wavelength division multiplexed light signals from a single optical fiber, the light signals carrying modulated information in the different wavelengths, comprising:

A) wavelength separation means, for spatially separating the different wavelength light signals from the single optical fiber;

B) a plurality of light detectors for detecting the modulated information in the different wavelength light signals, wherein detected information may be processed, transmitted or stored; and C) wavelength tuning means, interposed between the wavelength separation means and the plurality of light detectors, for tuning to different wavelengths $\lambda_c$ in the optical fiber transmission band, wherein $\lambda_c$ is defined as the center wavelength of the light signals, and whereby accommodation is provided to both multi-longitudinal mode laser diodes or distributed feedback (DFB) laser diode arrays as the source of the different wavelength light signals.

2. The apparatus of claim 1, wherein the wavelength tuning means is comprised of a lens assembly.

3. The apparatus of claim 2, wherein the lens assembly includes a divergent lens and a convergent lens, and wherein movement of the divergent lens in a plane generally perpendicular to the direction of the different wavelength light signals corrects the tuning of the receiver.

4. The apparatus of claim 3, wherein the laser is a distributed feedback laser diode array.

5. The apparatus of claim 3, wherein the laser is a multi-longitudinal mode laser.

6. The apparatus of claim 3, wherein the light source is a light emitting diode.

7. The apparatus of claim 2, further comprising a diffraction grating for splitting the light into its constituent components of separate wavelengths and polarizing recovery means, located between the wavelength tuning means and the diffraction grating, for polarizing the collimated light beam perpendicular to the direction of the grating grooves of the diffraction grating.

8. The apparatus of claim 7, wherein the polarizing recovery means is comprised of a polarizing beamsplitter, arranged and configured as a rhomboid prism having an exit port, and including a half wave plate at the exit port, wherein the polarizing beamsplitter and half wave plate polarize the collimated light beam perpendicular to the direction of the grating grooves of the diffraction grating and magnify the beam diameter in the direction parallel to the incidence plane at the diffraction grating, whereby the cross section of the diffracted beam is more closely circular in shape.

9. The apparatus of claim 7, wherein the plurality of light detectors are part of an array and the different wavelengths of light are directed onto the light detector array.

10. The apparatus of claim 7, wherein the different wavelengths of light are directed onto an optical fiber array, including a plurality of optical fibers, each of the plurality of optical fibers terminating at one of the plurality of photodetectors.

11. An apparatus for receiving and decoding a plurality of wavelength division multiplexed light signals from a single optical fiber, the light signals carrying modulated information in the different wavelengths, comprising:

A) wavelength separation means, for spatially separating the different wavelength light signals from the single optical fiber;

B) a physical array including a plurality of light detectors for detecting the modulated information in the different wavelength light signals, wherein detected information may be processed, transmitted or stored; and C) magnification means, physically interposed between the wavelength separation means and the physical array, for increasing the spatial dispersion of the different wavelength light signals at the physical array to accommodate different wavelength separation $\Delta\lambda$ between the carrier wavelengths $\lambda_i$ of the wavelength division multiplexed signals.

12. The apparatus of claim 11, wherein the magnification means includes a zoom lens assembly.

13. The apparatus of claim 12, wherein the different wavelength light signals are generated by a laser.

14. The apparatus of claim 13, wherein the laser is a distributed feedback laser diode array.

15. The apparatus of claim 13, wherein the laser is a multi-longitudinal mode laser.

16. The apparatus of claim 13, wherein the light source is a light emitting diode.

17. The apparatus of claim 11, wherein the physical array is a photodetector array.

18. The apparatus of claim 11, wherein the physical array includes an array of optical fibers.

19. A system for transmitting and receiving wavelength division multiplexed signals over a single optical fiber, comprising:

A) transmitter means, including:
 i) a single laser for generating a plurality of optical signals of different wavelengths;
 ii) external modulator means for modulating the optical signals in accordance with control signals, whereby the optical signals carry information; and
 iii) wavelength separation means, for spatially separating the different wavelength signals and directing the signals from the laser to the integrated optic modulator;

B) a multi-mode or single mode optical fiber; and

C) receiver means, including:
 i) wavelength separation means, for spatially separating the different wavelength signals transmitted by said optical fiber;
 ii) a light detector array or optical fiber array with each fiber terminated at a photodetector, for detecting the modulated information in the different wavelength signals, wherein transmitted information may be processed, transmitted or stored;
 iii) wavelength tuning means, interposed between the input optical fiber and the light detector array, for tuning to different center wavelengths $\lambda_c$ in the optical fiber transmission band, whereby accommodation is provided to both multi-longitudinal mode laser diodes or distributed feedback (DFB) laser diode arrays; and
 iv) magnification means, physically interposed between the wavelength tuning means and the light detector array, for increasing the spatial dispersion of the different wavelength light signals at the light detector array or optical fiber array to accommodate different wavelength separation $\Delta\lambda$ between the carrier wavelengths $\lambda_i$ of the wavelength division multiplexed signals.

20. A system for transmitting and receiving wavelength division multiplexed signals over a single optical fiber, comprising:

a) transmitter means, including:
 i) a plurality of lasers equal to n for generating a plurality m optical signals of different wavelengths, and wherein m is greater than n.
 ii) external modulator means for modulating the optical signals in accordance with control signals, whereby the optical signals carry information; and
 iii) wavelength separation means, for spatially separating the different wavelength signals and directing the signals from the lasers to the integrated optic modulator;

b) a multi-mode or single mode optical fiber; and c) receiver means, including:
 i) wavelength separation means, for spatially separating the different wavelength signals transmitted by the optical fiber;
 ii) a light detector array for detecting the modulated information in the different wavelength signals, wherein transmitted information may be processed, transmitted or stored; and iii) optical components for tuning the receiver to detect the specific set of wavelengths used in the WDM optical system.

21. The apparatus of claim 20, wherein the lasers are multi-longitudinal mode lasers.

22. The apparatus of claim 20, wherein said wavelength separation means includes a diffraction grating which is a holographic grating.

23. The apparatus of claim 20, wherein:

a) each of the lasers are multi-longitudinal mode lasers;

b) the external modulator means is an integrated optic device, wherein the integrated optic device includes a plurality of directional coupler integrated optic structures, wherein two parallel channel waveguides are provided for each of the directional couplers and control voltages are applied to electrodes overlying the channel waveguides to attenuate or propagate a light wave traveling through the directional couplers; and c) the wavelength separation means includes a collimating lens for collimating the beam from said laser, a mirror to reflect the collimated beam to a diffraction grating, and a focusing lens to focus the different wavelengths of the beam onto the external modulator means.

24. The apparatus of claim 20, further comprising:

a) a power and temperature controller device cooperatively connected to the lasers, wherein the wavelength shifts of the lasers are minimized;

b) a modulation controller device, operatively connected to the external modulator means, for activating the external modulator to encode information into the different wavelengths of the beam; and c) detector array controller means, operatively connected to the light detector array, for receiving the detected information and for retransmitting, processing or storing the detected information.

25. The apparatus of claim 20, wherein the optical fiber is a multi-mode fiber.

26. A method of wavelength division multiplexing a plurality of signals over an optical fiber, comprising the steps of:

a) generating a plurality "m" of optical signals of different wavelengths from "n" laser diodes, wherein m is greater than n;

b) spatially separating the different wavelength signals and directing the signals from the laser to an integrated optic modulator;

c) modulating the optical signals with the integrated optic modulator in accordance with control signals, whereby the optical signals carry information;

d) receiving the modulated optical signals; and e) tuning the receiver to the center frequency $\lambda_c$ of the m optical signals.

27. The method of claim 26, further including the step of separating the m optical signals and focusing the signals onto a photodetector array with a zoom lens.

* * * * *

UNITED STATES PATENT AND TRADEMARK OFFICE
CERTIFICATE OF CORRECTION

PATENT NO. : 5,793,912
DATED : August 11, 1998
INVENTOR(S) : Boord et al.

It is certified that error appears in the above-identified patent and that said Letters Patent is hereby corrected as shown below:

Column 1, after Related Applications should read --This is a continuation-in-part application of U.S. Patent Application Ser. No. 08/482,642, filed June 7, 1995, now issued as U.S. Patent No. 5,608,826, which is a continuation-in-part of U.S. Patent Application Ser. No. 08/257,083, filed June 9, 1994, now issued as U.S. Patent No. 5,450,510.--

Signed and Sealed this

Sixteenth Day of February, 1999

Attest:

*Attesting Officer*

*Acting Commissioner of Patents and Trademarks*